(12) United States Patent
Bosch et al.

(10) Patent No.: US 9,479,443 B2
(45) Date of Patent: Oct. 25, 2016

(54) SYSTEM AND METHOD FOR TRANSPORTING INFORMATION TO SERVICES IN A NETWORK ENVIRONMENT

(71) Applicant: CISCO TECHNOLOGY, INC., San Jose, CA (US)

(72) Inventors: Hendrikus G. P. Bosch, Aalsmeer (NL); Ian McDowell Campbell, Bow Mar, CO (US); Humberto J. La Roche, Ocean, NJ (US); James N. Guichard, New Boston, NH (US); Surendra M. Kumar, San Ramon, CA (US); Paul Quinn, Wellesley, MA (US); Alessandro Duminuco, Milan (IT); Jeffrey Napper, Delft (NL); Ravi Shekhar, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 112 days.

(21) Appl. No.: 14/285,843

(22) Filed: May 23, 2014

(65) Prior Publication Data

US 2015/0334027 A1 Nov. 19, 2015

Related U.S. Application Data

(63) Continuation of application No. 14/279,724, filed on May 16, 2014.

(51) Int. Cl.
*H04L 12/851* (2013.01)
*H04L 12/801* (2013.01)
(Continued)

(52) U.S. Cl.
CPC .......... *H04L 47/2408* (2013.01); *H04L 45/38* (2013.01); *H04L 47/12* (2013.01); *H04L 47/14* (2013.01); *H04W 72/0493* (2013.01); *H04W 88/16* (2013.01)

(58) Field of Classification Search
CPC ............... H04L 12/14; H04L 12/1403; H04L 12/1467; H04L 12/4633; H04L 41/0893; H04L 45/30; H04L 67/14; H04L 67/1027; H04M 15/00; H04M 15/64; H04M 15/66; H04M 15/80; H04M 15/81; H04M 15/83; H04M 15/85; H04M 15/854; H04W 4/24
See application file for complete search history.

(56) References Cited

U.S. PATENT DOCUMENTS

| | | |
|---|---|---|
| 3,629,512 A | 12/1971 | Yuan |
| 4,769,811 A | 9/1988 | Eckberg et al. |

(Continued)

FOREIGN PATENT DOCUMENTS

| | | |
|---|---|---|
| CN | 104011687 A | 8/2014 |
| CN | 105098809 | 11/2015 |

(Continued)

OTHER PUBLICATIONS

U.S. Appl. No. 14/279,724, filed May 16, 2014 entitled "System and Method for Transporting Information to Services in a Network Environment," Inventor(s): Hendrikus G.P. Bosch, et al.

(Continued)

*Primary Examiner* — Alpus H Hsu
*Assistant Examiner* — Dharmesh Patel
(74) *Attorney, Agent, or Firm* — Patent Capital Group

(57) ABSTRACT

An example method is provided in one example embodiment and may include receiving a packet for a subscriber at a gateway, wherein the gateway includes a local policy anchor for interfacing with one or more policy servers and one or more classifiers for interfacing with one or more service chains, each service chain including one or more services accessible by the gateway; determining a service chain to receive the subscriber's packet; appending the subscriber's packet with a header, wherein the header includes, at least in part, identification information for the subscriber and an Internet Protocol (IP) address for the local policy anchor; and injecting the packet including the header into the service chain determined for the subscriber.

17 Claims, 6 Drawing Sheets

(51) Int. Cl.
 *H04W 72/04* (2009.01)
 *H04L 12/721* (2013.01)
 *H04W 88/16* (2009.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | McFarland |
| 7,165,107 B2 | 1/2007 | Pouyoul et al. |
| 7,197,660 B1 | 3/2007 | Liu et al. |
| 7,209,435 B1 | 4/2007 | Kuo et al. |
| 7,231,462 B2 | 6/2007 | Berthaud et al. |
| 7,333,990 B1 | 2/2008 | Thiagarajan |
| 7,443,796 B1 | 10/2008 | Albert et al. |
| 7,458,084 B2 | 11/2008 | Zhang et al. |
| 7,486,622 B2 | 2/2009 | Regan et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee |
| 7,647,422 B2 | 1/2010 | Singh et al. |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,814,284 B1 | 10/2010 | Glass et al. |
| 7,831,693 B2 | 11/2010 | Lai |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,907,595 B2 | 3/2011 | Khanna et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda |
| 8,180,909 B2 | 5/2012 | Hartman et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,311,045 B2 | 11/2012 | Quinn et al. |
| 8,316,457 B1 | 11/2012 | Paczkowski et al. |
| 8,442,043 B2 | 5/2013 | Sharma et al. |
| 8,464,336 B2 | 6/2013 | Wei et al. |
| 8,520,672 B2 | 8/2013 | Guichard et al. |
| 8,601,152 B1 | 12/2013 | Chou |
| 8,612,612 B1 | 12/2013 | Dukes et al. |
| 8,676,980 B2 | 3/2014 | Kreeger et al. |
| 8,700,892 B2 | 4/2014 | Bollay |
| 8,730,980 B2 | 5/2014 | Bagepalli et al. |
| 8,743,885 B2 | 6/2014 | Khan et al. |
| 8,762,534 B1 | 6/2014 | Hong et al. |
| 8,762,707 B2 | 6/2014 | Killian |
| 8,792,490 B2 | 7/2014 | Jabr et al. |
| 8,793,400 B2 | 7/2014 | McDysan |
| 8,825,070 B2 | 9/2014 | Akhtar et al. |
| 8,830,834 B2 | 9/2014 | Sharma et al. |
| 8,904,037 B2 | 12/2014 | Haggar et al. |
| 9,001,827 B2 | 4/2015 | Appenzeller |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | McDysan |
| 9,178,812 B2 | 11/2015 | Guichard et al. |
| 9,253,274 B2 | 2/2016 | Quinn et al. |
| 9,300,585 B2 | 3/2016 | Kumar et al. |
| 2001/0023442 A1 | 9/2001 | Masters |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0088698 A1 | 5/2003 | Singh et al. |
| 2003/0110081 A1 | 6/2003 | Tosaki |
| 2003/0120816 A1 | 6/2003 | Berthaud et al. |
| 2003/0226142 A1 | 12/2003 | Rand |
| 2004/0109412 A1 | 6/2004 | Hansson |
| 2004/0148391 A1 | 7/2004 | Lake, Sr. et al. |
| 2004/0199812 A1 | 10/2004 | Earl et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0086367 A1 | 4/2005 | Conta et al. |
| 2005/0152378 A1 | 7/2005 | Bango et al. |
| 2005/0160180 A1 | 7/2005 | Rabje et al. |
| 2005/0204042 A1 | 9/2005 | Banerjee |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan |
| 2006/0045024 A1 | 3/2006 | Previdi et al. |
| 2006/0074502 A1 | 4/2006 | McFarland |
| 2006/0092950 A1 | 5/2006 | Arregoces et al. |
| 2006/0112400 A1 | 5/2006 | Zhang et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0204612 A1 | 8/2009 | Keshavarz-Nia et al. |
| 2009/0300207 A1 | 12/2009 | Giaretta |
| 2009/0300407 A1 | 12/2009 | Kamath et al. |
| 2009/0305699 A1 | 12/2009 | Deshpande |
| 2009/0328054 A1 | 12/2009 | Paramasivam et al. |
| 2010/0054260 A1 | 3/2010 | Pandey et al. |
| 2010/0063988 A1 | 3/2010 | Khalid |
| 2010/0080226 A1 | 4/2010 | Khalid et al. |
| 2010/0165985 A1 | 7/2010 | Sharma et al. |
| 2010/0214949 A1 | 8/2010 | Smith et al. |
| 2010/0254385 A1 | 10/2010 | Sharma et al. |
| 2010/0318784 A1 | 12/2010 | Rao et al. |
| 2011/0023090 A1 | 1/2011 | Asati et al. |
| 2011/0131338 A1* | 6/2011 | Hu ..................... H04W 76/02 709/229 |
| 2011/0167471 A1 | 7/2011 | Riley et al. |
| 2011/0235508 A1 | 9/2011 | Goel |
| 2011/0246899 A1 | 10/2011 | Kwon et al. |
| 2011/0255538 A1 | 10/2011 | Srinivasan |
| 2011/0264905 A1 | 10/2011 | Ovsiannikov |

(56) References Cited

U.S. PATENT DOCUMENTS

| | | |
|---|---|---|
| 2011/0320580 A1 | 12/2011 | Zhou |
| 2012/0030365 A1 | 2/2012 | Lidstrom et al. |
| 2012/0087262 A1 | 4/2012 | Rasanen |
| 2012/0131662 A1 | 5/2012 | Kuik |
| 2012/0185853 A1 | 7/2012 | Haviv et al. |
| 2012/0278804 A1 | 11/2012 | Narayanasamy et al. |
| 2012/0281540 A1 | 11/2012 | Khan |
| 2012/0281544 A1 | 11/2012 | Anepu |
| 2012/0327767 A1* | 12/2012 | Ramakrishnan ........ H04L 12/14 370/230 |
| 2012/0327947 A1 | 12/2012 | Cai |
| 2012/0331135 A1 | 12/2012 | Alon et al. |
| 2013/0003735 A1 | 1/2013 | Chao et al. |
| 2013/0003736 A1 | 1/2013 | Szyszko |
| 2013/0031271 A1 | 1/2013 | Bosch et al. |
| 2013/0040640 A1 | 2/2013 | Chen et al. |
| 2013/0044636 A1 | 2/2013 | Koponen |
| 2013/0086236 A1 | 4/2013 | Baucke et al. |
| 2013/0097323 A1 | 4/2013 | Barsness et al. |
| 2013/0121137 A1 | 5/2013 | Feng et al. |
| 2013/0121207 A1 | 5/2013 | Parker |
| 2013/0124708 A1 | 5/2013 | Lee |
| 2013/0125124 A1 | 5/2013 | Kempf et al. |
| 2013/0155902 A1 | 6/2013 | Feng et al. |
| 2013/0163594 A1 | 6/2013 | Sharma |
| 2013/0163606 A1 | 6/2013 | Bagepalli et al. |
| 2013/0188554 A1 | 7/2013 | Cai |
| 2013/0198412 A1 | 8/2013 | Saito |
| 2013/0215215 A1 | 8/2013 | Gage et al. |
| 2013/0215888 A1 | 8/2013 | Zhang et al. |
| 2013/0223290 A1 | 8/2013 | Zhou |
| 2013/0223449 A1 | 8/2013 | Koganti et al. |
| 2013/0235874 A1 | 9/2013 | Ringdahl et al. |
| 2013/0238774 A1 | 9/2013 | Davison et al. |
| 2013/0272305 A1 | 10/2013 | Lefebvre et al. |
| 2013/0279503 A1 | 10/2013 | Chiabaut |
| 2013/0311675 A1 | 11/2013 | Kancherla |
| 2014/0010084 A1 | 1/2014 | Kavunder et al. |
| 2014/0010085 A1 | 1/2014 | Kavunder et al. |
| 2014/0036730 A1 | 2/2014 | Nellikar |
| 2014/0050223 A1 | 2/2014 | Foo et al. |
| 2014/0059544 A1 | 2/2014 | Koganty et al. |
| 2014/0079070 A1 | 3/2014 | Sonoda et al. |
| 2014/0105062 A1 | 4/2014 | McDysan |
| 2014/0119367 A1 | 5/2014 | Han |
| 2014/0169215 A1 | 6/2014 | Rajendran et al. |
| 2014/0169375 A1 | 6/2014 | Khan et al. |
| 2014/0188676 A1 | 7/2014 | Marmolejo-Meillon et al. |
| 2014/0201374 A1 | 7/2014 | Ashwood-Smith et al. |
| 2014/0241247 A1 | 8/2014 | Kempf et al. |
| 2014/0254603 A1 | 9/2014 | Banavalikar |
| 2014/0259012 A1 | 9/2014 | Nandlall et al. |
| 2014/0279863 A1 | 9/2014 | Krishnamurthy |
| 2014/0280836 A1 | 9/2014 | Kumar et al. |
| 2014/0280950 A1 | 9/2014 | Bhanujan et al. |
| 2014/0304412 A1 | 10/2014 | Prakash et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard |
| 2014/0334488 A1 | 11/2014 | Guichard et al. |
| 2014/0344439 A1 | 11/2014 | Kempf et al. |
| 2014/0351452 A1 | 11/2014 | Bosch et al. |
| 2014/0362682 A1 | 12/2014 | Guichard et al. |
| 2014/0362857 A1 | 12/2014 | Guichard |
| 2014/0372617 A1 | 12/2014 | Houyou et al. |
| 2014/0379938 A1 | 12/2014 | Bosch et al. |
| 2015/0003455 A1 | 1/2015 | Haddad et al. |
| 2015/0012988 A1 | 1/2015 | Jeng et al. |
| 2015/0026362 A1* | 1/2015 | Guichard ................ H04L 45/30 709/242 |
| 2015/0052516 A1 | 2/2015 | French |
| 2015/0063102 A1 | 3/2015 | Mestery et al. |
| 2015/0063166 A1 | 3/2015 | Sif et al. |
| 2015/0071285 A1 | 3/2015 | Kumar et al. |
| 2015/0074276 A1 | 3/2015 | DeCusatis |
| 2015/0085870 A1 | 3/2015 | Narasimha et al. |
| 2015/0089082 A1 | 3/2015 | Patwardhan et al. |
| 2015/0092551 A1* | 4/2015 | Moisand ............ H04L 12/4633 370/235 |
| 2015/0106624 A1 | 4/2015 | Gero |
| 2015/0120890 A1 | 4/2015 | Ghai |
| 2015/0131484 A1 | 5/2015 | Aldrin |
| 2015/0137973 A1 | 5/2015 | Kumar et al. |
| 2015/0156035 A1 | 6/2015 | Foo et al. |
| 2015/0172170 A1 | 6/2015 | Bosch et al. |
| 2015/0180767 A1 | 6/2015 | Tam et al. |
| 2015/0195197 A1 | 7/2015 | Yong |
| 2015/0215172 A1 | 7/2015 | Kumar |
| 2015/0222516 A1 | 8/2015 | Deval |
| 2015/0236948 A1 | 8/2015 | Dunbar |
| 2015/0263901 A1 | 9/2015 | Kumar et al. |
| 2015/0271102 A1 | 9/2015 | Antich |
| 2015/0271203 A1 | 9/2015 | Duminuco et al. |
| 2015/0271204 A1 | 9/2015 | Duminuco et al. |
| 2015/0271205 A1 | 9/2015 | Duminuco et al. |
| 2015/0312801 A1 | 10/2015 | Khan et al. |
| 2015/0333930 A1 | 11/2015 | Aysola |
| 2015/0334595 A1 | 11/2015 | Bosch |
| 2015/0365322 A1 | 12/2015 | Shatzkamer et al. |

FOREIGN PATENT DOCUMENTS

| | | | |
|---|---|---|---|
| CN | 105099751 | 11/2015 | |
| EP | 2122483 | 7/2008 | |
| EP | 2073449 | 6/2009 | |
| EP | 2791802 | 6/2013 | |
| EP | 2945329 | 11/2015 | |
| WO | WO2005/104650 | 11/2005 | |
| WO | WO2008/063858 | 5/2008 | |
| WO | WO2008/088954 | 7/2008 | |
| WO | WO 2011012165 A1 * | 2/2011 | ............ H04L 12/14 |
| WO | WO2013/101765 | 4/2013 | |
| WO | WO2013/090035 | 6/2013 | |
| WO | WO2013/095714 | 6/2013 | |
| WO | WO2014/189670 | 11/2014 | |
| WO | WO2015/073190 | 5/2015 | |
| WO | WO2015/094567 | 6/2015 | |

OTHER PUBLICATIONS

Cisco Systems, Inc., "Chapter 11: Virtual Routing and Forwarding," Cisco Active Network Abstraction 3.7 Reference Guide, Feb. 1, 2010, 7 pages.

"ETSI TS-123-401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ©European Telecommunication Standards Institute 2010; Jun. 2010, 261 pages.

"ETSI TS-129-212 V9.5.0 (Jan. 2011) Technical Specification: Universal Mobile Telecommunications System (UMTS); LTE; Policy and charging control over Gx reference point (3GPP TS 29.212 version 9.5.0 Release 9)," © European Telecommunication Standards Institute 2011; Jan. 2011,120 pages.

"ETSI TS-136-401 V8.6.0 (Jul. 2009) Technical Specification: LTE; Evolved Universal Terrestrial Radio Access Network (E-UTRAN); Architecture description (EGPP TS 36.401 version 8.60 Release 8)," ©European Telecommunication Standards Institute 2009; Jul. 2009, 21 pages.

Quinn, P., et al., "Network Service Header," Network Working Group Internet-Draft draft-quinn-sfc-nsh-02.txt, Feb. 14, 2014, 21 pages.

USPTO Oct. 16, 2015 Non-Final Office Action from U.S. Appl. No. 14/279,724.

USPTO Feb. 18, 2016 Notice of Allowance from U.S. Appl. No. 14/279,724.

EPO Oct. 6, 2015 Extended Search Report and Written Opinion from European Application Serial No. 15160159.8.

Quinn, P., et al., "Service Function Chaining (SFC) Architecture," IETF Standard Working Draft draft-quinn-sfc-arch-05.txt; May 5, 2014, 31 pages.

(56) References Cited

OTHER PUBLICATIONS

Salaets, Bart, "Advanced Traffic Steering & Optimization Technologies," MENOG 2014, Mar. 30, 2015, XP055214882 http://www.menog.org/presentations/menog-14/272-Advanced_Traffic_Steering_v04.pdf.

3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.

3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-TRAN) access (Release 13), 3GPP, 650 Route des Lucioles—Sophia Antipolis Valbonne—France, Dec. 2015.

"3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.

"3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Valbonne—France, Mar. 2010; 116 pages.

"3GPP TS 29.212 V13.1.0 (2015) Technical Specification: 3rd Generation Partnership Project; Technical Specification Group Core Network and Terminals; Policy and Chargig Control (PCC); Reference points (Release 13)," 3rd Generation Partnership Project (3GPP), 650 Route des Lucioles—Sophia Antipolis Valbonne—France, Mar. 2015; 230 pages.

"ANSI/SCTE 35 2007 Digital Program Insertion Cueing Message for Cable," Engineering Committee, Digital Video Subcommittee, American National Standard, Society of Cable Telecommunications Engineers, ©Society of Cable Telecommunications Engineers, Inc. 2007 All Rights Reserved, 140 Philips Road, Exton, PA 19341; 42 pages.

"Cisco Nexus 1000V Series Switches," Cisco Systems, Inc., Jul. 2013; 3 pages.

"Cisco vPath and vServices Overview," Chapter 1, Cisco vPath and vServices Reference Guide, OL-27702-02, Oct. 19, 2012; 10 pages.

"How do switches, vSwitches and distributed vSwitches differ? Getting Vmware terminology straight," TechTarget, Jun. 11, 2013; 4 pages.

"Interim report: Subscriber Aware SGi/Gi-LAN Virtualization," ConteXtream, ETSI, Jul. 24, 2014; 16 pages.

"Lawful interception," Wikipedia, the free encyclopedia, Nov. 17, 2015; 7 pages.

"NFV Isg PoC Proposal: SDN Enabled Virtual Epc Gateway," ETSI, NFV World Congress San Jose, May 5-7, 2015; 7 pages.

"Realising the Benefits of Network Functions Virtualisation in Telecoms Networks," Intel Corporation, White Paper, First published on or about Apr. 20, 2015.

"Virtual Gi-LAN and EPC to Create and Deploy Services Faster," Intel Corporation, Solution Brief, Software-based Network Solutions; Copyright © 2015 Intel Corporation. All rights reserved; 6 pages.

"Virtual Solutions for your NFV Environment," F5 Networks Solution Center, first published on or about Feb. 2, 2016; 12 pages.

"What is the difference between the Data Link Layer and the Network Layer in the OSI Model?" Yahoo Answers; Dec. 14, 2008; 2 pages.

"CEA-708," from Wikipedia, the free encyclopedia, Nov. 15, 2012; 16 pages.

"Comparison between OS virtualization and hypervisor-based virtualization," Servernest, Feb. 4, 2015, Copyright © 2009-2011 by ServerNest GmbH, 2 pages.

"Digital Program Insertion," from Wikipedia, the free encyclopedia, Jan. 2, 2012; 1 page.

"Dynamic Adaptive Streaming over HTTP," from Wikipedia, the free encyclopedia, Oct. 25, 2012; 3 pages.

ETSI TS 129 212 V13.4.0 (Jan. 2016) Technical Specification: Universal Mobile Telecommunications System (UMTS); LTE; Policy and Charging Control (PCC); Reference points (3GPP TS 29.212 version 13.4.0 Release 13), European Telecommunications Standards Institute (ETSI), 650 Route des Lucioles, F-06921 Sophia Antipolis Cedex—France, Jan. 2016; 249 pages.

"ETSI TS 132 251 V12.7.0 (Oct. 2014) Technical Specification: Digital cellular telecommunications system (Phase 2+); Universal Mobile Telecommunications System (UMTS); LTE; Telecommunication management; Charging management; Packet Switched (PS) domain charging (3GPP TS 32.251 version 12.7.0 Release 12)," European Telecommunications Standards Institute (ETSI), 650 Route des Lucioles, F-06921 Sophia Antipolis Cedex—France, Oct. 2014; 164 pages.

"G-Streamer and in-band Metadata," from RidgeRun Developer Connection, Jun. 19, 2012; 5 pages.

"IEEE Standard for the Functional Architecture of Next Generation Service Overlay Networks, IEEE Std. 1903-2011," IEEE, Piscataway, NJ, Oct. 7, 2011; 147 pages.

"ISO/IEC JTC 1/SC 29, Information Technology—Dynamic Adaptive Streaming over HTTP (DASH)—Part 1: Media Presentation Description and Segment Formats," International Standard ©ISO/IEC 2012—All Rights Reserved; Jan. 5, 2012; 131 pages.

"M-PEG 2 Transmission," ©Dr. Gorry Fairhurst, 9 pages [Published on or about Jan. 12, 2012] http://www.erg.abdn.ac.uk/future-net/digital-video/mpeg2-trans.html.

"MPEG Transport Stream," from Wikipedia, the free encyclopedia, Nov. 11, 2012; 7 pages.

Amazon Web Services, "Amazon Simple Workflow Service Developer Guide," API Version, Jan. 25, 2012, 175 pages http://aws.amazon.com/documentation/swf/.

Amir, et al., "An Active Service Framework and its Application to Real-time Multimedia Transcoding," in Proc. ACM SIGCOMM Conference {SIGCOMM '98), Sep. 1998, 12 pages.

Bhatia, M., et al., "Bidirectional Forwarding Detection (BFD) on Link Aggregation Group (LAG) Interfaces," Internet Engineering Task Force RFC 7130, Feb. 2014; 11 pages.

Bitar, N., et al., "Interface to the Routing System (I2RS) for Service Chaining: Use Cases and Requirements," Internet Engineering Task Force, draft-bitar-i2rs-service-chaining-01; Feb. 14, 2014; 15 pages.

Bosch, et al., "Telco Clouds and Virtual Telco: Consolidation, Convergence, and Beyond", May 23-27, 2011, Proceedings of 2011 IFIP/IEEE International Symposium on Integrated Network Management (IM), Dublin, 7 pages.

Boucadair et al., "Differentiated Service Function Chaining Framework," Network Working Group Internet Draft draft-boucadair-network-function-chaining-03, Aug. 21, 2013.

Boucadair, et al., "Analysis of Potential Solutions for Revealing a Host Identifier (HOST_ID) in Shared Address Deployments," Internet Engineering Task Force (IETF), RFC 6967, Jun. 2013, 24 pages; http://tools.ietf.org/pdf/rfc6967.pdf.

Bouthors, N.P., et al., "Metadata Transport in SFC," Network Working Group draft-bouthors-sfc-md-oo.txt, Sep. 19, 2014; 22 pages.

Cao, Z., "Data Plane Processing Acceleration Framework," Internet Engineering Task Force Internet Draft, draft-cao-dataplane-acceleration-framework-o1, Jul. 4, 2014; 10 pages.

Carmes, "Delivering Data Plane Acceleratin for ETSI's NFV PoC," SDxC Central, Jan. 16, 2014; 8 pages.

Carpenter, B., et al., "Using the IPv6 Flow Label for Equal Cost Multipath Routing and Link Aggregation in Tunnels," Network Working Group, RFC 6438, Nov. 2011, 9 pages; http://www.hjp.at/doc/rfc/rfc6438.html.

Chaloupka, Jiri, "NFV Pro Poskytovatele Sluzeb," Tech SP2, Cisco Connect, Praha, Ceska republika; Mar. 24-25, 2015; 114 pages.

Chen, E., et al., "Outbound Route Filtering Capability for BGP-4," Network Working Group, RFC 5291, Aug. 2008, 12 pages; http://www.hjp.at/doc/rfc/rfc5291.html.

(56) References Cited

OTHER PUBLICATIONS

Cisco Systems, Inc., "Cisco vPath and vServices Reference Guide for Intercloud Fabric," Apr. 19, 2015, 48 pages http://www.cisco.com/c/en/us/td/docs/switches/datacenter/vsg/sw_vsg_ic/5_2_1_IC_2_2_1/vpath_vservices/reference/guide/vpath_vservices_reference.pdf.

Cisco Systems, Inc., "Call Flows for Dual-Stack PMIPv6 and GTP," Intelligent Wireless Access Gateway Gateway Configuration Guide, first published on or about Feb. 27, 2014; 14 pages.

C43 Cisco Systems, Inc., "Cisco Quantum Services Platform," first published on or about Mar. 25, 2014; 2 pages.

Cisco Systems, Inc., "RADIUS Attribute 8 (Framed-IP-Address) in Access Requests," Sep. 8, 2009; 8 pages.

Cisco Systems, Inc., "RADIUS Vendor-Specific Attributes (VSA)," Cisco IOS Security Configuration Guide, first published on or about Sep. 13, 2014; 10 pages.

Cisco Systems, Inc., Vmware, Inc., "Joint Cisco and Vmware Solution for Optimizing Virtual Desktop Delivery," Sep. 2008.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

EPO Apr. 7, 2010 Search Report and Written Opinion from European Application No. 08705725.3.

Fernando, et al., "Virtual Service Topologies in BGP VPNs," Internet Engineering Task Force (IETF) Internet-Draft, draft-rfernando-virt-topo-bgp-vpn-01, Oct. 22, 2012, 11 pages.

Freier, et al., "The Secure Sockets Layer (SSL) Protocol Version 3.0," Internet Engineering Task Force (IETF), RFC 6101, Aug. 2011, 67 pages; http://tools.ietf.org/pdf/rfc6101.pdf.

Gray, et al., "Leases: An Efficient Fault-Tolerant Mechanism for Distributed File Cache Consistency," Proceedings of the Twelfth ACM Ssymposium on Operating Systems Principles, New York, NT (Dec. 3-6, 1989), 9 pages; http://www.stanford.edu/class/cs240/readings/89-leases.pdf.

Haeffner, W., "Service Function Chaining Use Cases in Mobile Networks," Service Function Chaining Internet Draft draft-ietf-afc-use-case-mobility-03, Jan. 13, 2015; 25 pages.

Han, Bo, et al. "Network function virtualization: Challenges and opportunities for innovations." Communications Magazine, IEEE 53.2 (Feb. 2015): 90-97.

Higgins, Tim, "How We Test SPI+NAP Routers," SmallNetBuilder, Oct. 18, 2002; 5 pages.

ip infusion™, "A Redundant Architecture for Routing Protocols," White Paper, Jun. 2002, XP002240009, 8 pages; www.ipinfusion.com/pdf/WP_Redundancy_rev0602.pdf.

Jeff Pang, Distributed Hash Tables< 2004, 33 pages; http://www.cs.cmu.edu/~dga/15-744/S07/lectures/16-dht.pdf.

Jiang, et al., "An Architecture of Service Function Chaining," IETF Network Working Group Internet Draft, draft-jiang-sfc-arch-01.txt, Feb. 14, 2014; 12 pages.

Katz, D., "Bidirectional Forwarding Detection (BFD)," Internet Engineering Task Force RFC 5880, Jun. 2010; 49 pages.

Kiehle, Christian, et al., "Standardized Geoprocessing—Taking Spatial Data Infrastructures One Step Further", 9th Agile International Conference on Geographic Information Science, Apr. 22, 2006, 10 pages.

Kim, et al., "Floodless in Seattle: A Scalable Ethernet Architecture for Large Enterprises," Computer Communication Review, Oct. 2008, 14 pages; http://www.cs.princeton.edu/~chkim/Research/Seattle/seattle.pdf.

Kumar, S., et al., "Service Function Path Optimization: draft-kumar-sfc-sfp-optimization00.txt," Internet Engineering Task Force, IETF; Standard Working Draft, May 10, 2014.

Ladner, Roy, et al., "Case-Based Classification Alternatives to Ontologies for Automated Web Service Discovery and Integration" proceedings of the SPIE—The International Society for Optical Engineering, Apr. 17, 2006, 8 pages.

Lampson, "How to Build a Highly Available System Using Consensus," Proceedings of the 10th International Workshop on Distributed Algorithms (Oct. 1996), 17 pages; http://research.microsoft.com/en-us/um/people/blampson/58-Consensus/Acrobat.pdf.

Lapukhov, "Scaling MPLS networks," INE, Mar. 24, 2015, 15 pages; http://blog.ine.com/2010/08/16/scaling-mpls-networks/.

Lemmens, Rob, et al., "Semantic and Syntactic Service Descriptions at Work in Geo-service Chaining", 9th Agile International Conference on Geographic Information Science, Apr. 20, 2006, 11 pages.

Lesniewski-Laas, et al., "SSL splitting: securely serving data from untrusted caches," Laboratory for Computer Science, Massachusetts Institute of Technology, First published on or about Aug. 30, 2008, 13 pages; http://pdos.csail.mit.edu/papers/ssl-splitting-usenixsecurity03.pdf.

Marques, P., et al., "Dissemination of Flow Specification Rules," Network Working Group, RFC 5575, Aug. 2009, 22 pages.

McKeown, et al., "OpenFiow: Enabling Innovation in Campus Networks," ACM SIGCOMM Computer Communication Review, vol. 38, No. 2, Apr. 2008, 6 pages.

Netmanias, "LTE QoS: SDF and EPS Bearer QoS," Netmanias: Analyze Trends, Technologies and Market, Sep. 11, 2013; 18 pages.

PCT Mar. 10, 2009 International Preliminary Report on Patentability from International Application No. PCT/IB05/01013, 5 pages.

PCT May 13, 2009 International Search Report from International Application No. PCT/US2008/050349.

PCT Jan. 2, 2013 International Search Report and Written Opinion of the International Searching Authority from International Application Serial No. PCT/US2012/048764; 14 pages.

PCT Jun. 26, 2014 International Preliminary Report on Patentability from International Application PCT/US2012/067502.

PCT Jan. 19, 2015 International Search Report and Written Opinion from International Application Serial No. PCT/US2014/062244.

PCT Aug. 20, 2015 International Search Report and Written Opinion of the International Searching Authority from International Application Serial No. PCT/US2015/020242; 12 pages.

PCT Aug. 8, 2016 International Search Report and Written Opinion from the International Searching Authority from International Application Serial No. PCT/US2015/06092; 11 pages.

PCT Jun. 30, 2008 International Search Report and Written Opinion from International Application No. PCT/IB05/01013, 5 pages.

PCT Apr. 4, 2013 International Search Report and Written Opinion from International Application No. PCT/US2012/067502 11 pages.

Quinn, et al., "Network Service Header," Network Working Group Internet Draft draftquinn-nsh-01, Jul. 12, 2013.

Quinn, P., "Network Service Header," Network Working Group, draft-quinn-sfc-nsh-07.txt, Feb. 24, 2015; 43 pages.

Quinn, P., et al., "Service Function Chaining (SFC) Architecture," Network Working Group, draft-quinn-sfc-arch-o5.txt, May 5, 2014; 31 pages.

Quinn, P., et al., "Network Service Header," Networking Working Group Internet Draft draft-quinn-nsh-00.txt, Jun. 13, 2013, 20 pages.

C83 Raszuk, R., et al., "BGP vector Routing," Network Working Group, Oct. 27, 2014, 12 pages; https://tools.ietf.org/html/draft-patel-raszuk-bgp-vector-routing-04.

Rekhter, Y., et al., "A Border Gateway Protocol 4 (BGP-4)," Network Working Group, RFC 4271, Jan. 2006, 104 pages; https://tools.ietf.org/html/rfc4271.

Rescorla, "Introduction to Distributed Hash Tables," Proceedings of the sixty-seventh Internet Engineering Task Force, IAB Plenary, Nov. 5-10, 2006, San Diego, CA, 39 pages; http://www.ietf.org/proceedings/65/slides/plenaryt-2.pdf.

Rosen, E., et al., "MPLS Label Stack Encoding," Network Working Group RFC 3032, Jan. 2001; 23 pages.

Rosen, E., et al., "BGP/MPLS IP Virtual Private Networks (VPNs)," Network Working Group, RFC 4364, Feb. 2006, 47 pages; https://tools.ietf.org/html/rfc4364.

Salisbury, Brent, "The Control Plane, Data Plane and Forwarding Plane in Networks," NetworkStatic: Brent Salisbury's Blog, Sep. 27, 2012; 6 pages.

Salsano, S., et al., "Generalized Virtual Networking: an enabler for Service Centric Networking and Network Function Virtualization", 16th International Telecommunications Network Strategy and Plan-

(56) References Cited

OTHER PUBLICATIONS ning Symposium, Networks 2014, Sep. 17-19, 2014, Funchal, Portugal (pdf on arXiv) (slides: pptx pdf SlideShare) http://netgroup.uniroma2.it/people/faculties/stefano-salsano/stefano-salsano-publications-list/.

Salvadori, Elio (Generalization virtual network topologies in OPENFlow-based networks, Dec. 2011, entire document, IEEE).

Singh, Sumeet et al., "Service Portability: Why HTTP redirect is the model for the future [on line]," Record of the 5th Workshop on Hot Topics, Hot Nets V, Irvine CA, Nov. 29-30, 2006 URL:http://conferences.sigcomm.org/hotnets/2006/singh06service.pdf, 6 pages.

Snell, "HTTP/2.0 Discussion: Binary Optimized Header Encoding," Network Working Group, Internet Draft, Expires Aug. 22, 2013, Feb. 18, 2013, 8 pages; http://tools.ietf.org/pdf/draft-snell-httpbis-keynego-02.pdf.

Williams, et al., et al., "Overlay Path Option for IP and TCP," Network Working Group, Internet Draft, Expires Dec. 21, 2013, Jun. 19, 2013, 17 pages; http://tools.ietf.org/pdf/draft-williams-overlaypath-ip-tcp-rfc 04.pdf.

Wolf, K.H., "VPP: Virtual Presence Protocol," Internet Draft, draft-wolf-vpp-01.txt, Jul. 5, 1999; 46 pages.

Wong, F., et al., "SMPTE-TT Embedded in ID3 for HTTP Live Streaming, draft-smpte-id3-http-live-streaming-00," Informational Internet Draft, Jun. 2012; 7 pages.

Wu, et al., "Resilient and efficient load balancing in distributed hash tables," Journal of Network and Computer Applications 32 (Jan. 2009), 16 pages; http://sist.sysu.edu.cn/~dwu/papers/jnca09-lb.pdf.

Yavatkar, R., et al., "A Framework for Policy-Based Admission Control," Network Working Group, RFC 2753, Jan. 2000; 21 pages.

Yourtchenko, et al., "Revealing hosts sharing an IP address using TCP option," Network Working Group, Internet Draft, Expires Jun. 10, 2012, Dec. 8, 2011, 10 pages; http://tools.ietf.org/pdf/draft-wing-nat-reveal-option-03.pdf.

U.S. Appl. No. 14/684,363, filed Apr. 11, 2015, entitled "System and Method to Chain Distributed Applications in a Network Environment," Inventor(s): Hendrikus G.P. Bosch, et al.

U.S. Appl. No. 14/717,887, filed May 20, 2015, entitled "System and Method to Facilitate the Assignment of Service Functions for Service Chains in a Network Environment," Inventor(s): Robert M. Batz, et al.

U.S. Appl. No. 14/728,010, filed Jun. 2, 2015, entitled "System and Method to Facilitate the Assignment of Service Functions for Service Chains in a Network Environment," Inventors: Robert M. Batz et al.

\* cited by examiner

SYSTEM AND METHOD FOR TRANSPORTING INFORMATION TO SERVICES IN A NETWORK ENVIRONMENT

RELATED APPLICATION

This application is a continuation (and claims the benefit of priority under 35 U.S.C. §120) of U.S. application Ser. No. 14/279,724, filed May 16, 2014, entitled "SYSTEM AND METHOD FOR TRANSPORTING INFORMATION TO SERVICES IN A NETWORK ENVIRONMENT," Inventors Hendrikus G. P. Bosch, et al. The disclosure of the prior application is considered part of (and is incorporated by reference in) the disclosure of this application.

TECHNICAL FIELD

This disclosure relates in general to the field of communications and, more particularly, to a system and method for transporting information to services in a network environment.

BACKGROUND

Networking architectures have grown increasingly complex in communication environments. Data traffic has grown extensively in recent years, which has significantly increased the demands on network resources. Network operators often provide differentiated services to subscribers according to one or more policies for the subscribers. As the number of mobile subscribers and the number of operator services provided to mobile subscribers increases, efficient management of communication resources becomes even more critical. In some instances, providing multiple services to multiple subscribers may cause network equipment to be overwhelmed, provide suboptimal performance or create congestion in the network. Accordingly, there are significant challenges in managing network resources, particularly for communicating information between services operating on subscriber data traffic.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
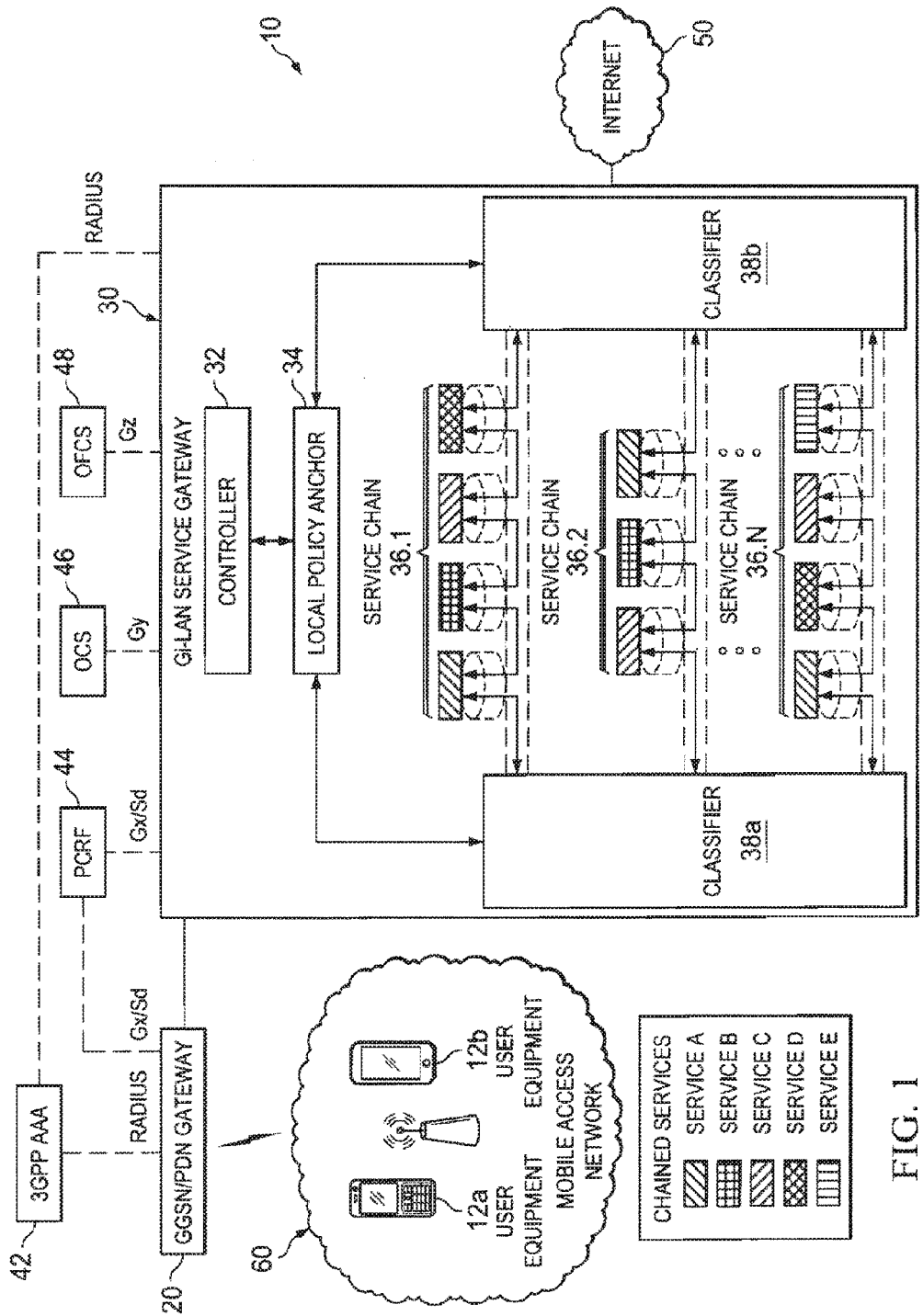
FIG. 1 is a simplified block diagram illustrating a communication system to facilitate transporting information to services in a network environment according to one embodiment of the present disclosure.

A method is provided in one example embodiment and may include receiving a packet for a subscriber at a gateway, wherein the gateway includes a local policy anchor for interfacing with one or more policy servers and one or more classifiers for interfacing with one or more service chains, each service chain including one or more services accessible by the gateway; determining a service chain to receive the subscriber's packet; appending the subscriber's packet with a header, wherein the header includes, at least in part, identification information for the subscriber and an Internet Protocol (IP) address for the local policy anchor; and injecting the packet including the header into the service chain determined for the subscriber. In some instances, the subscriber's packet may be a First-Sign-of-Life (FSOL) packet and determining the service chain to receive the subscriber's packet may further include determining, by the local policy anchor, the service chain to receive the subscriber's packet based on policy information for the subscriber from the one or more policy servers; and communicating, at least in part, the determined service chain and the IP address of the local policy anchor to a classifier included in the gateway for interfacing with the determined service chain.

In some cases, the communicating may include communicating at least one of policy information and charging information associated with one or more services in the determined service chain and wherein the classifier maintains an association between the subscriber, the determined service chain and the at least one of the policy information and the charging information for use in subsequent headers for one or more subsequent subscriber packets. In some instances, the header for the subscriber's packet may be a Network Service Header (NSH). In other instances, the header may include at least one of policy information and charging information associated with at least one service in the determined service chain. In yet other instances, the one or more policy servers can include at least one of: a policy charging and rules function (PCRF); an online charging system (OCS); and an offline charging system (OFCS).

In other cases, the method may further include consuming, by the at least one service, at least one of policy information and charging information included in the header to perform at least one of: enforcing one or more policies for the subscriber; and initiating a policy session for the subscriber with the local policy anchor using the IP address for the local policy anchor. In still other cases, the method may include receiving, by the local policy anchor, a policy update from a policy server for a service included in a service chain; and communicating the policy update to the service by performing at least one of: pushing, from the local policy anchor, the policy update to the service if the service has a policy session established with the local policy anchor for a subscriber; and appending a packet with the policy update.

Example Embodiments

Turning to FIG. 1, FIG. 1 is a simplified block diagram illustrating a communication system 10 to facilitate transporting information to services in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 may include multiple subscribers operating user equipment (UE) 12a-12b within a mobile access network 60, which may be in communication with a gateway general packet radio service (GPRS) support node (GGSN)/packet data network (PDN) gateway 20, which may interface with a Gi local access network (LAN) service gateway (SG) 30. Gi-LAN SG 30 may further interface with an internet 50. Communication system 10 may further include a 3GPP Authentication, Authorization and Accounting (AAA) element 42, a Policy and Charging Rules Function (PCRF) 44, an Online Charging System (OCS) 46 and an Offline Charging System (OFCS) 48. Gi-LAN SG 30 may further include a controller 32, a local policy anchor 34, classifiers 38a-38b and services A-E, which may be logically connected, to form one or more service chains 36.1-36.N. For example, service chain 36.1 may include services A, B, C and D connected together; service chain 36.2 may include services C, B and A connected together; and service chain 36.N may include services A, D, C and E connected together. Each service chain 36.1-36.N may interface with classifiers 38a-38b, which may inject or steer data flows for subscribers through one or more of service chains 36.1-36.N. In various embodiments services A-E may be hosted or accessible by Gi-LAN SG 30.

As discussed herein in this Specification, the terms 'user equipment', 'user' and 'subscriber' may be referred to interchangeably. Further, as discussed herein in this specification, PCRF 44, OCS 46 and/or OFCS 48 may be referred to generally as 'policy servers' or 'charging servers'. Additionally as discussed herein in this Specification, local policy anchor 34 may be referred to generally as a 'local policy anchor point'. Although illustrated separate, classifiers 38a-38b may be implemented as a common classifier unit within Gi-LAN SG 30 for interfacing with service chains 36.1-36.N.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Also provided in the architecture of FIG. 1 is a series of interfaces, which can offer mobility, policy control, AAA functions and/or charging activities (offline and/or online) for various network elements. For example, interfaces can be used to exchange point of attachment, location, and/or access data for one or more end users, for example, users operating UE 12a-12b. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include a DIAMETER protocol, service gateway interface (SGI), terminal access controller access-control system (TACACS), TACACS+, etc.

As shown in FIG. 1, a RADIUS-based interface may be maintained between AAA element 42, GGSN/PDN gateway (PGW) 20 and Gi-LAN SG 30. Communication system 10 may be configured with various DIAMETER-based interfaces to manage and provision policy and/or charging information for Gi-LAN SG 30. For example, Gx and/or Sd DIAMETER-based interfaces may be maintained between PCRF 44, GGSN/PGW 20 and Gi-LAN SG 30. Additionally, a Gy DIAMETER-based interface may be maintained between OCS 46 and Gi-LAN SG 30. Further, a Gz DIAMETER-based interface may be maintained between OFCS 48 and Gi-LAN SG 30.

In more general terms, 3GPP defines the EPS as specified in TS 23.401, TS 36.401, TS 29.212, etc. The EPS generally consists of UE access networks and an Evolved Packet Core (EPC). Access networks (e.g., mobile access network 60) may include 3GPP access networks including legacy access networks such as GSM EDGE Radio Access Network (GERAN), UMTS Terrestrial Radio Access Network (UTRAN), generally referred to as 3G, or LTE access networks such as Evolved UTRAN (E-UTRAN), generally referred to as 4G or LTE, or may include non-3GPP IP access networks such as digital subscriber line (DSL), Cable, WiMAX, code division multiplex access (CDMA) 2000, WiFi, or the Internet.

Before detailing some of the operational aspects of FIG. 1, it is important to understand characteristics of Gi-LAN SG 30. The following contextual information may be viewed as a basis from which the present disclosure may be properly explained. Such information is offered earnestly for teaching purposes only and, therefore should not be construed in any way to limit the broad teachings of the present disclosure. Gi-LAN SG 30 may provide a Software Defined Networking (SDN) architecture for chaining or linking together services A-E to form service chains 36.1-36.N. SDN is an approach to configuring computer networking equipment and software that separates and abstracts the control plane and data plane of networking systems. SDN decouples the control plane that makes decisions about where traffic is sent from the underlying data plane that forwards traffic to the selected destination, which may allow network administrators/service providers to manage network services through abstraction of lower level functionality into virtualized services that may be hosted or accessible by Gi-LAN SG 30.

As illustrated in FIG. 1, each service chain 36.1-36.N may be configured with a service overlay or tunnel (dashed lines for each service chain) using SDN techniques, which may provide a mechanism to link together one or more of services A-E, which may be anchored on one or more of service chains 36.1-36.N. In various embodiments, a forwarding or routing table may be maintained for each service anchored on a given service chain (e.g., services A-D for service chain 36.1, etc.), which may enable forwarding packets from one service to another along the service chain or to a classifier (e.g., for a service at the end of a service chain, depending on traffic flow direction from or to a subscriber). Although only five services are illustrated in FIG. 1, it should be understood that any number of services may be hosted or accessible through Gi-LAN SG 30. Further, any number of services may be anchored on a given service chain. In various embodiments, controller 32 may be an SDN controller provisioned with one or more applications to interface with one or more policy and/or charging servers (e.g., PCRF 44, OCS 46, OFCS 48) and local policy anchor 34 in order to facilitate steering subscriber data traffic into one or more service chains 36.1-36.N using classifiers 38*a*-38*b*.

Thus, Gi-LAN SG 30 may provide an infrastructure to host one or more services A-E that may augment mobile subscriber packet flows between a mobile node (e.g., UE 12*a*-12*b*) and remote servers (e.g., servers accessible via internet 50). In various embodiments, services hosted or accessible by Gi-LAN SG 30 can include, but not be limited to, TCP optimizers, caching (DNS) servers, Hypertext Transfer Protocol (HTTP) proxies, analytics services, Deep Packet Inspection (DPI) services, Network Address and Port Translation (NA(P)T) functions, parental controls, captive portals, user interactions, video optimization, web optimization, charging and policy, etc.

Services A-E hosted or accessible by Gi-LAN SG 30 can be chained together to enable a service provider to create a unique service offering for a mobile subscriber and/or sets of mobile subscribers based on the one or more services. For example, on a First-Sign-of-Life (FSOL) packet for a given mobile subscriber's packet flow, Gi-LAN SG 30 may classify the packet flow according to a classification provided by a policy infrastructure (e.g., PCRF, 44, OCS 46, OFCS 48, etc.). This classification may be used to then uniquely map the subscriber's flow to a particular service chain, which may enable a service provider to create 'service plans' for specific mobile traffic (e.g., over-the-top voice vs. service-provider voice, video plans, etc.).

As used herein in this Specification, the term 'service plans' may refer to a set of services to be applied to a subset of the mobile subscribers (e.g., a AVIS® service plan with a series of services specifically for AVIS® employees), as opposed to PCRF specific plans such as gold, silver, bronze, etc., which are often used to apportion traffic for all mobile subscribers of a particular service provider.

For services that may be anchored on a service chain to operate well in a 3GPP environment, these services should be provisioned with appropriate subscriber specific parameters. In a 3GPP system these parameters are often kept in databases associated with a PCRF, OCS, OFCS, etc. (e.g., a Subscription Profile Repository (SPR), User Data Repository (UDR), etc.). In various embodiments, PCRF 44, OCS, 46, and/or OFCS 48 policy control elements may contain or reference a subscriber database that can be disseminated to both a 3GPP access system (e.g., AAA element 42) and to Gi-LAN SG 30. Based on information such as, for example, subscription information, congestion information, radio-access-type information, etc. Gi-LAN SG 30 may enforce the rules for service selection and/or flow steering through multiple services running in Gi-LAN SG 30. Thus, Gi-LAN SG 30 may represent a Policy Control and Enforcement Function (PCEF).

Gi-LAN SG 30 may provide or host services for all of service provider's mobile subscribers; each service catering to potentially many individual packet flows. Given that each mobile subscriber can generate many independent packet flows, the request performance and capacity of policy and charging network elements (e.g., PCRF 44, OCS 46, OFCS 48, etc.) presents potential shortcomings that are an area of concern. Thus, a hierarchical policy classification and distribution architecture is important to enable the policy infrastructure for communication system 10 to scale with the number of services anchored on a given chain, the number of subscribers steered onto a chain, and/or the number of packet flows created by the independent mobile subscribers.

In accordance with one embodiment, communication system 10 can overcome the aforementioned shortcomings (and others) by providing scalable policy distribution to chained services for mobile subscribers serviced via Gi-LAN SG 30 through use of packet service headers that may be appended to IP packets from mobile subscribers. The packet service headers may include, for example, subscriber identification information and an IP address for a local policy anchor as well as policy information, charging information, etc. that may be consumed by one or more services anchored on a service chain. Accordingly, policy distribution to services anchored on a chain may depend only on the number of subscribers that are active in Gi-LAN SG 30. In various embodiments, the packet service header may be based on a Network Service Header (NSH) as defined by Internet Engineering Task Force (IETF) standards.

As illustrated in FIG. 1, classifier 38*a*, 38*b* for each statically defined service chain 36.1-36.N can host local policy anchor 34, which may act as a policy cache towards a policy server (e.g., PCRF 44, OCS 46, etc.). Additionally, local policy anchor 34 may represent itself as a local policy server to all the services anchored on each statically defined service chain 36.1-36.N. Every IP packet carried over a given service chain may be appended with a packet service header, which, as noted above, may carry parameters such as the mobile subscriber identity, IP address of the local policy anchor point and additional policy related information (e.g., PCRF rules, online and/or offline charging rules, etc.) that may be consumed by one or more services anchored on a service chain.

In one or more embodiments, the IP address of the local policy anchor point can be included (e.g., encapsulated) in the NSH packet header to enable a service to pull additional policy parameters that may not be carried in the IP packet itself from the local policy and charging anchor (e.g., local policy anchor 34). Thus, the IP address may act as a configuration parameter passed to a service, which may allow the service to establish a policy control session with local policy anchor 34, PCRF 44, OCS 46 and/or OFCS 48. In one or more embodiments, this configuration can also be realized through dynamic service appliance configuration.

Since classifiers 38*a*-38*b* for each service chain may be provided with its own policy anchor point (e.g., local policy anchor 34), and all policy requests from a service chain can be directed to the policy anchor point for a chain, the load on the standard policy infrastructure may be only dependent on the number of subscribers active in Gi-LAN SG. Once a local policy anchor point has cached the policy information for a subscriber, no further policy information may be needed from the policy infrastructure. However, if, for example, a policy server (e.g., PCRF 44, OCS, 46, OFCS 48) for the policy infrastructure needs to enforce a new policy or update a policy, it may relay the new and/or updated policies to local policy anchor 34. In various embodiments, Gi-LAN SG 30, via classifiers 38*a*-38*b*, can then enforce the new and/or updated policies on the services in a given chain by including the new policy rules in-line with IP traffic in the NSH packet header for packets flowing through the service chain. Alternatively, in one or more embodiments, services anchored on a given chain may maintain a policy session with local policy anchor 34, which may enable local policy anchor 34 to enforce new and/or updated policies by pushing the new and/or updated policy rules onto the services anchored on the chain.

Thus, the solution provided by communication system 10 may provide for the combination of a per-service chain policy cache (e.g., local policy anchor 34) for a classifier, combined with policy distribution to all services anchored on a chain by way of a standardized service header, which can carry subscriber information, configuration parameters, 3GPP policy and/or charging information as well as other types of policy and/or charging information, etc. to one or more services anchored on one or more service chains.

During operation, for example, a FSOL IP packet originating from a given UE (e.g., UE 12a) may be communicated to Gi-LAN SG 30 and may be classified according to one or more policies provided by the policy infrastructure (e.g., PCRF 44, OCS 46, OFCS 48, etc.). Gi-LAN SG 30, via classifier 38a, may forward the packet to local policy anchor 34. If local policy anchor 34 has not cached the mobile subscriber's policy information, it may load the subscriber's policy and/or charging information from a given policy server (e.g., PCRF 44, OCS 46, OFCS 48, and/or other similar policy server.) by way of one or more standardized DIAMETER-based interfaces (e.g., Gx/Sd, Gy, Gz, etc.). In various embodiments, policy and/or charging information may be retrieved or pulled from one or more policy and/or charging servers by controller 32 or may be published by such servers and periodically pushed to controller 32 over an appropriate DIAMETER-based interface or other similar policy control interface.

Local policy anchor 34 may execute the policies and/or charging rules/functions and may derive a classification, which can indicate a service chain to receive the flow. For purposes of the present example only, assume that the classification indicates that the subscribers flow should be forwarded to service chain 36.1, which may include services A, B, C and D hosted or accessible by Gi-LAN SG 30. Local policy anchor 34 may communicate or inform classifiers 38a-38b of the service chain classification determined for the subscriber's flow and may provide a set of parameters to the classifiers which can be encapsulated in an NSH packet header for the FSOL packet and subsequent packets of the subscriber's flow. Classifiers 38a-38b may store, among other things, the determined service chain classification for the subscribers flow as well as any parameters for the subscribers flow received from local policy anchor 34.

Gi-LAN SG 30 may inject, via classifier 38a, the subscriber's IP packet into service chain 36.1 with the NSH packet header. If a service on service chain 36.1 enforces a policy and/or charging rule/function, it may use the information carried in the NSH packet header for enforcing the policy and/or charging and/or may initiate a policy session with local policy anchor 34. In case a service requires additional policy information, it can use the NSH carried header information for obtaining additional policy information from local policy anchor 34 such that no additional interaction with a policy and/or charging server (e.g., PCRF 44, OCS 46 and OFCS 48) may be needed.

As noted previously, the parameters contained in a service header (e.g., NSH packet header) may include, but not be limited to, a mobile subscriber identity for the subscriber, the IP address of local policy anchor 34 (or other configuration parameters), policy information, charging information, etc. In one or more embodiments, a subscriber's mobile subscriber identity may include, but not be limited to, International Mobile Subscriber Identity (IMSI), Mobile Subscriber Integrated Services Digital Network-Number (MSISDN), Temporary Mobile Subscriber Identity (TMSI), etc. In one or more embodiments, additional subscriber information may be included in the NSH header including, but not limited to, an International Mobile Station Equipment Identity (IMEI), an International Mobile Equipment Identity Software Version (IMEI-SV), Radio Access Technology (RAT) type, MSISDN, IMSI, etc.

In various embodiments, classifiers 38a-38b may maintain or store an association for each subscriber, including but not limited to, subscriber identification information, one or more determined service chains to receive the subscriber's packets, policy and/or charging information for one or more services on an associated service chain, etc. Once a subscriber's flow has been classified by local policy anchor 34, classifier 38a may automatically append each of the subscriber's subsequent packets with a corresponding service header (e.g., NSH packet header) and inject the appended packet into the corresponding determined service chain for the subscriber. In a similar manner, each packet destined for the subscriber (e.g., the subscriber's UE) received from one or more remote servers, etc. that may be flowing from internet 50 may also be appended with a corresponding service header and injected into the determined service chain for the subscriber using classifier 38b.

In one or more embodiments, policy and/or charging information for a subscriber may be discarded by local policy anchor 34 if there has not been any traffic for that subscriber for a pre-determined amount of time, or when an explicit de-activation may be communicated to local policy anchor 34 from a given policy server. In one or more embodiments, new policies for a given policy server can be enforced, updated, renewed, etc. for one or more services anchored on one or more service chains by the policy server 'pushing' its new policy information to local policy anchor 34. In one or more embodiments, local policy anchor 34 may relay the new policies to the service(s) by including the new policies in-line (e.g., through use of an NSH packet header, with or without a payload) on subsequent packet flows for chains including the service(s). In one or more embodiments, local policy anchor 34 may also 'push' the new policies onto the associated service(s) if the service(s) if the service(s) has established a policy session with local policy anchor 34.

Accordingly, the solution provided by communication system 10 may provide a hierarchical mechanism for policy distribution record collection via Gi-LAN SG 30. Classifier 38a, 38b may be adorned with its own local policy anchor point for each service chain 36.1-36.N operating through Gi-LAN SG 30. By appending, for each subscriber, IP packet flows entering Gi-LAN SG 30 with a service header (e.g., an NSH) various types of information may be distributed to associated services connected to a given chain. As noted, the information may include, but not be limited to, subscriber information (e.g., mobile subscriber identity, classification, etc.), IP address information of local policy anchor 34 (or other configuration parameters), and/or other policy and/or charging related information from one or more policy and/or charging servers (e.g., PCRF 44, OCS 46 and/or OFCS 48).

Thus, several advantages may be realized through the solution provided by communication system 10. These may be realized by the ability of Gi-LAN SG 30 to provide a local policy infrastructure that may scale only with the number of mobile subscribers active in Gi-LAN SG 30, which may help to avoid repeated requests to one or more policy servers by localizing such traffic within Gi-LAN SG 30. For example, local policy anchor 34 may field all policy requests for newly created mobile subscriber's packet flows and for all independent services that may be anchored on service chains hosted or accessible by Gi-LAN SG 30. Other advantages may be realized by the ability to piggyback subscriber information, policy and/or charging control information, configuration parameters, etc. in the data plane for packets flowing through a service chain using service headers (e.g., NSH packet headers) for subscriber packet flows, which may potentially reduce latency for the system.

In various embodiments, UE 12a-12b can be associated with users, employees, clients, customers, etc. wishing to initiate a flow in communication system 10 via some network. The terms "user equipment," "mobile node," "end user," "user," and "subscriber" are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 10. UE 12a-12b may also be inclusive of a suitable interface to a human user such as a microphone, a display, a keyboard, or other terminal equipment.

UE 12a-12b may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-12b may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

AAA element 42 is a network element responsible for accounting, authorization and authentication functions for UE 12a-12b. For AAA considerations, AAA element 42 may provide a mobile node IP address, the accounting session identification (Acct-Session-ID) and other mobile node states in appropriate messaging (e.g., via access-Request/access-Response messages). Authentication refers to the process where a subscriber's identity is authenticated, typically by providing evidence that it holds a specific digital identity such as an identifier and the corresponding credentials. The authorization function determines whether a particular subscriber is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by subscribers for the purpose of capacity and trend analysis, cost allocation, billing, etc. In addition, it may record events such as authentication and authorization failures, and include auditing functionality, which permits verifying the correctness of procedures carried out based on accounting data. In various embodiments, accounting messages can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

PCRF 44 may decide policy control and/or charging activities to apply to a given subscriber based on various Policy Charging and Control (PCC) rules. PCRF 44 can be configured to use user subscription information as a basis for the policy and charging control decisions. The subscription information may apply for both session-based and non-session based services. Additionally, PCRF 44 may determine PCC rules based on an application or service described to the PCRF from an Application Function (AF), which may be provisioned by a network service provider. In one or more embodiments, an AF may describe applications/services to PCRF 44 that may require dynamic policy and/or charging control for one or more subscribers. The dynamic policy and/or charging controls may include, but not be limited to, controlling the detection for service data flows, setting charging instructions for service data flows, setting QoS levels for service data flows and/or gating.

OCS 46 may provide online credit control rules/functions and OFCS 48 may provide offline credit control rules/functions for one or more subscribers within communication system 10. In various embodiments, OCS 46 and/or OFCS 48 may enable a service provider to manage services and/or application charging/rating rules/functions across all access types, device types and/or subscribers for communications system 10. Although only one OCS 46 and OFCS 48 are illustrated in FIG. 1, there may be multiple OCSs and OFCSs provisioned within communication system 10.

It should be understood that mobile access network 60 may include other elements, gateways, etc. that may make up an EPC for the network. The EPC generally comprises a Mobility Management Entity (MME), a serving gateway support node (SGSN), a serving gateway (SGW), a GGSN/PGW and a PCRF. The EPC components may be referred to generally as control nodes, control gateways or simply gateways. EPC components such as the MME, SGSN and SGW are not shown in FIG. 1 in order to highlight other features of communication system 10.

The MME is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME may further provide for UE bearer procedures including activation, deactivation and modification; SGW and GGSN/PGW selection for UE as well as authentication services. The SGW is a data plane element that can manage user mobility and interfaces with RANs. The SGW can also maintain data paths between radio access points, such as eNode Bs (eNodeBs), and the PGW. The GGSN/PGW may provide connectivity for UEs to external packet data networks, such as, for example the Internet. The SGSN may provide access for legacy universal mobile telecommunications systems (UMTS) network devices.

Figure 2:
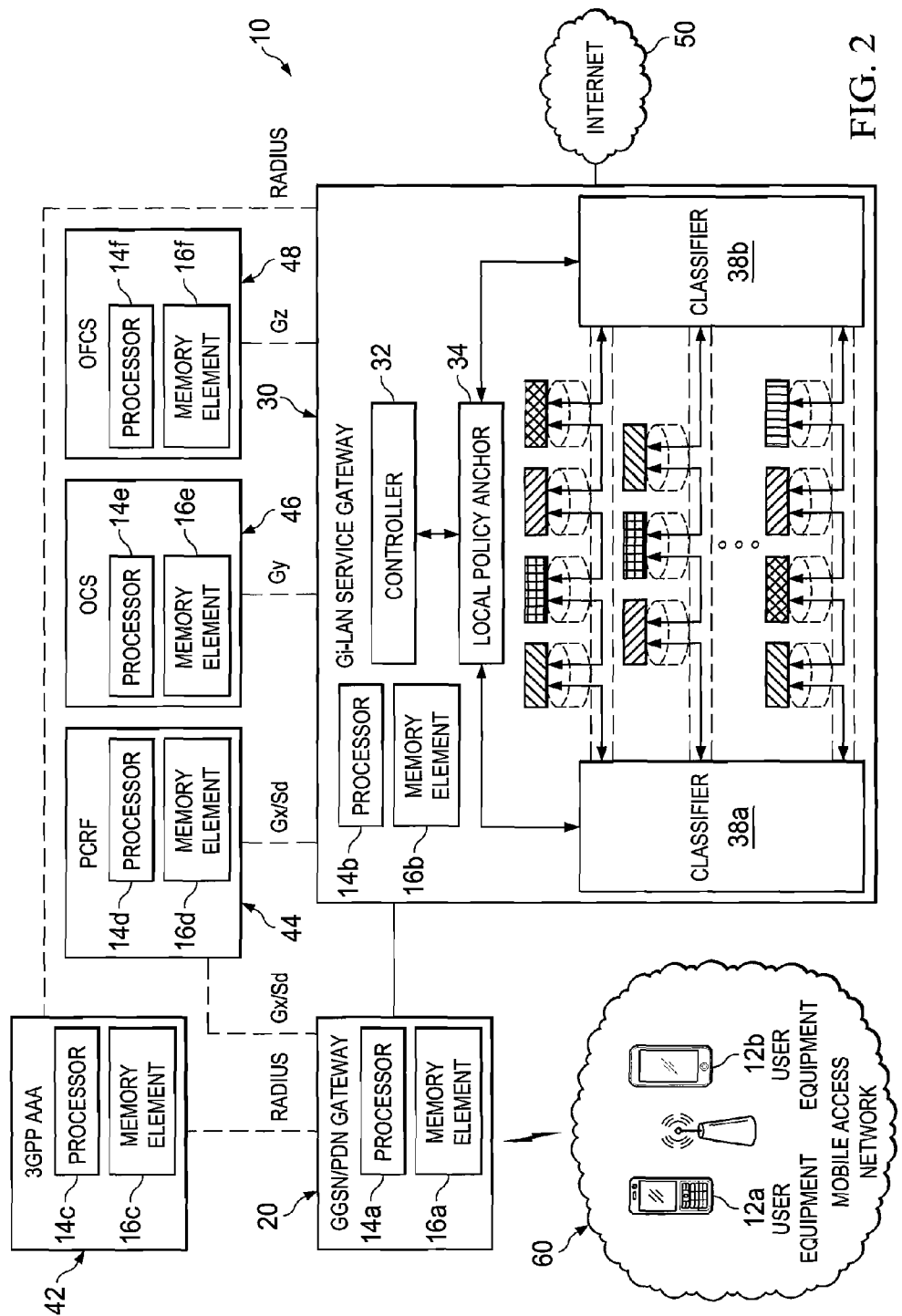
FIG. 2 is a simplified block diagram illustrating example details associated with one potential embodiment of the communication system.

Turning to FIG. 2, FIG. 2 is a simplified block diagram illustrating additional details associated with one potential embodiment of communication system 10. FIG. 2 includes GGSN/PGW 20, Gi-LAN SG 30, AAA element 42, PCRF 44, OCS 46 and OFCS 48 of communication system 10. Each of these elements includes a respective processor 14a-14f and a respective memory element 16a-16f. Hence, appropriate software and/or hardware is being provisioned in GGSN/PGW 20, Gi-LAN SG 30, AAA element 42, PCRF 44, OCS 46 and OFCS 48 in order to facilitate transporting subscriber, service, policy and/or charging information in the network environment of communication system 10. Note that in certain examples, certain databases (e.g., for storing subscriber information, policy information, charging information (online and offline), service information for one or more services, combinations thereof or the like) can be consolidated with memory elements (or vice versa), or the storage can overlap/exist in any other suitable manner. UE 12a-12b, mobile access network 60 and internet 50 are also shown in FIG. 2.

In one example implementation, GGSN/PGW 20, Gi-LAN SG 30, AAA element 42, PCRF 44, OCS 46 and OFCS 48 are network elements, which are meant to encompass network appliances, servers, routers, switches, gateways, bridges, load balancers, firewalls, processors, modules, or any other suitable device, component, element, or object operable to exchange information that facilitates or otherwise helps coordinate transporting information to one or more services (e.g., for networks such as those illustrated in FIG. 2). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of GGSN/PGW 20, Gi-LAN SG 30, AAA element 42, PCRF 44, OCS 46 and OFCS 48 can include memory elements for storing information to be used in achieving the information transportation operations, as outlined herein. Additionally, each of these devices may include a processor that can execute software or an algorithm to perform the information transportation activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to GGSN/PGW 20, Gi-LAN SG 30, AAA element 42, PCRF 44, OCS 46 and OFCS 48 could be provided in any database, register, control list, cache, or storage structure: all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and user equipment (e.g., mobile nodes) can also include suitable interfaces for receiving, transmitting, and/or otherwise communicating data or information in a network environment.

Note that in certain example implementations, the information transportation functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
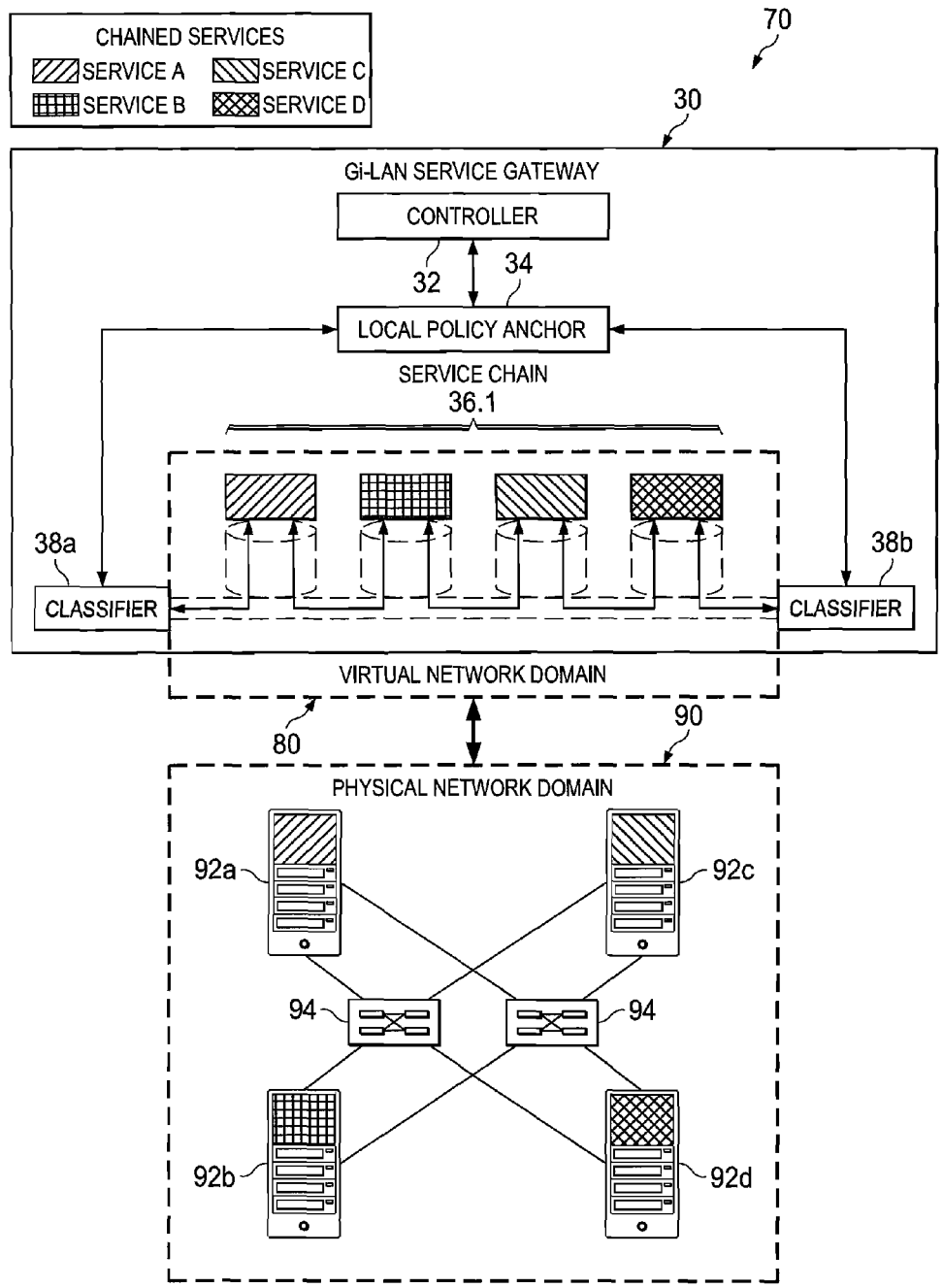
FIG. 3 is a simplified block diagram illustrating example details associated with a service chain in accordance with one embodiment of the communication system.

Turning to FIG. 3, FIG. 3 is a simplified block diagram illustrating example details of a logical view 70 of service chain 36.1 in accordance with one embodiment of the communication system. FIG. 3 includes Gi-LAN SG 30, a virtual network domain 80, which may include virtualized services A, B, C and D hosted or accessible by Gi-LAN SG 30 and chained together to form service chain 36.1, and a physical network domain 90, which may include computing resources (e.g., servers, gateways, load balancers, etc.) 92a-92d coupled together through fabric 94. As shown in FIG. 3, computing resource 92a may provide service A, server 92b may provide service B, server 92c may provide service C and server 92d may provide service D. It should be understood that the organization and/or association of servers 92a-92b and services A-D is provided for illustrative purposes only and is not meant to limit to the scope of the present disclosure. Also shown in FIG. 3, are classifiers 38a-38b, which may interface with service chain 36.1.

Using SDN techniques, resources within physical network domain 90 (e.g., servers 92a-92d, fabric 94, other computing resources, storage, etc.) may be abstracted into virtual network domain 80, which may include virtualized services A, B, C and D (e.g., virtual machines) interconnected using a service overlay or tunnel (dashed lines overlaying service interconnects). Virtual network domain 80 may provide a mechanism to manage subscriber flows through the services without the burden of having to manage the physical network connectivity of each virtualized service A-D. Abstraction into virtual network domain 80 may provide mechanisms for managing and/or operating physical network resources through network function virtualization (NFV). Computing resources 92a-92d providing services A-D may be moved or rearranged throughout physical network domain 90, throughout one or more clouds of computing resources, etc. while connectivity to the services may be maintained merely by updating forwarding and/or routing information configurable within virtual network domain 80.

Classifiers 38a-38b may mediate between virtual network domain 80 and physical network domain 90 using one or more logical interfaces. In various embodiments, controller 32 may be implemented as an SDN controller provisioned with one or more applications to interface with one or more policy and/or charging servers (e.g., PCRF 44, OCS 46, OFCS 48 as shown in FIGS. 1-2) and local policy anchor 34 in order to facilitate steering subscriber data traffic including service headers (e.g., NSH packet headers) through service chain 36.1 using classifiers 38a-38b. A forwarding or routing table may be maintained for each service A-D anchored service chain 36.1, which may enable forwarding packets for one or more subscribers from one service to another along the service chain or to a classifier (e.g., for a service at the end of a service chain, depending on traffic flow direction from or to a subscriber). In various embodiments, a forwarding or routing table for each service anchored on a given service chain (e.g., services A-D anchored on service chain 36.1) may be maintained/configured via controller 32 to manage subscriber flows between services or to classifiers 38a-38b. In some embodiments, a forwarding or routing table may also be maintained/configures by each service anchored on a given chain to manage subscriber flows between one or more services anchored on the chain or to classifiers 38a-38b.

Figure 4:
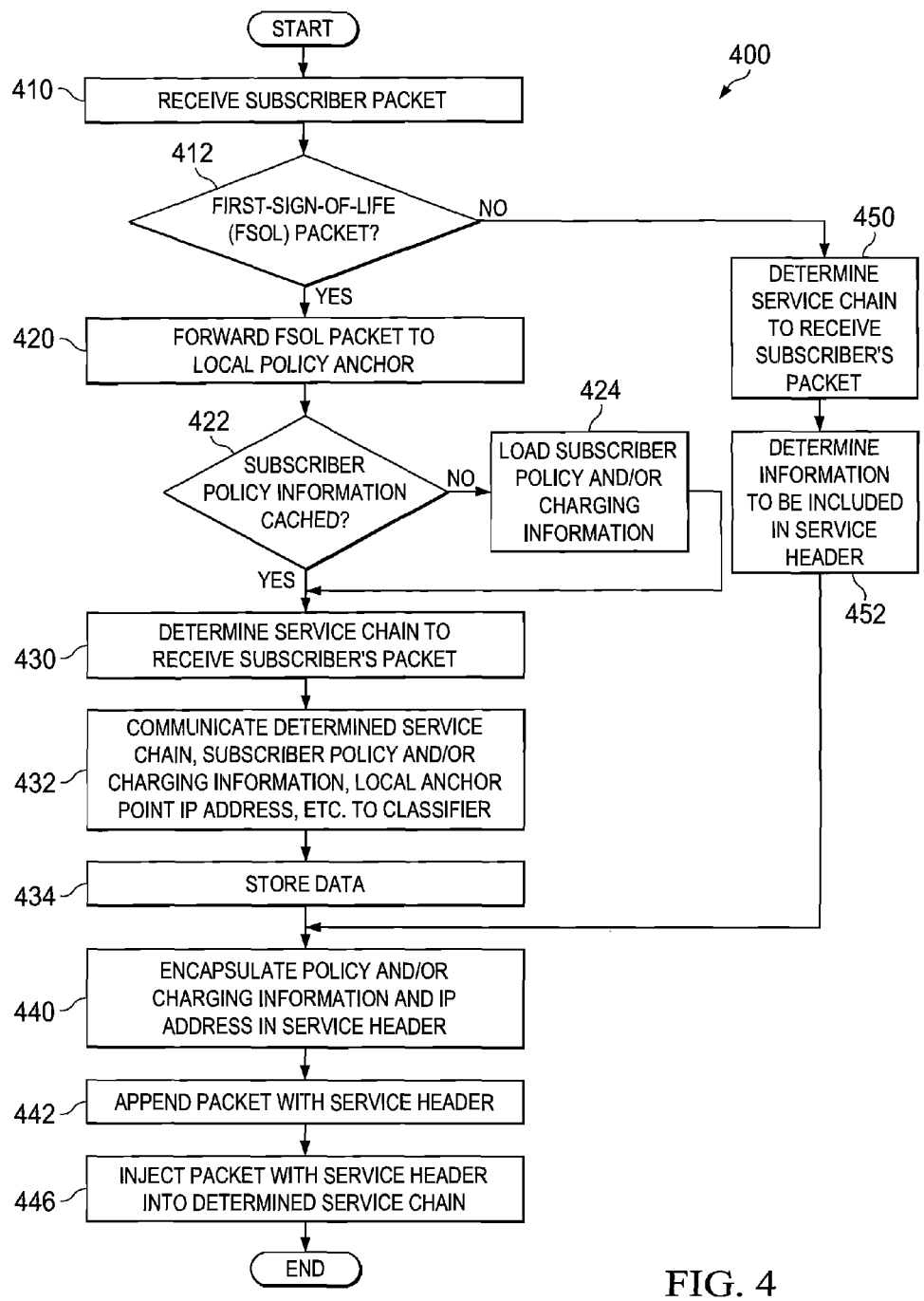
FIG. 4 is a simplified flow diagram illustrating example operations associated with transporting information to services in accordance with one potential embodiment of the communication system.

Turning to FIG. 4, FIG. 4 is a simplified flow diagram 400 illustrating example operations associated transporting information to one or more chained services in one example operation of communication system 10. In one particular embodiment, these operations may involve a subscriber for a given UE (e.g., UE 12a), Gi-LAN SG 30, controller 32, local policy anchor 34, classifier 38a and any of service chain 36.1-36.N, which may include any of chained services A-E hosted or accessible by Gi-LAN SG 30 as shown in FIG. 1.

Processing may start at 410 when a subscriber's packet may be received by Gi-LAN SG 30 via classifier 38a. At 412, classifier 38a may determine if the subscriber's packet is a First-Sign-of-Life packet. If it is an FSOL packet, classifier 38a can forward the packet to local policy anchor 34 at 420. If it is not an FSOL packet, classifier 38a may continue to process the packet at 450, which will be discussed in further detail below.

If the subscriber's packet is an FSOL packet, local policy anchor 34 may determine if policy information for the subscriber has previously been cached at 422. At 424, if policy information for the subscriber has not been previously cached, local policy anchor 34 may load policy and/or charging information for the subscriber from one or more policy and/or charging servers (e.g., PCRF 44, OCS 46, OFCS 48) via controller 32 using one or more DIAMETER-based interfaces. Based on the policy and/or charging information for the subscriber, local policy anchor 34 may determine a service chain to receive the subscriber's packet at 430. At 432, local policy anchor 34 may communicate the determined service chain, subscriber policy and/or charging information and an IP address for local policy anchor 34 to classifier 38a. At 434, classifier 38a may store the information in an association with the subscriber for use in subsequent packets that may be received from the subscriber. The information may also be communicated to and stored by classifier 38b. Recall further that classifiers 38a-38b may be implemented as a common classifier within Gi-LAN SG 30 for interfacing with service chains 36.1-36.N; thus, the information may be commonly stored for use with traffic originating either from a given UE or from a remote server (e.g., accessible via internet 50).

Returning to FIG. 4, classifier 38a may encapsulate the policy and/or charging information and the IP address for local policy anchor 34 in a service header for the subscriber's packet at 440. At 442, classifier 38b may append the packet with the service header. In one or more embodiments, the header may be an NSH as defined by IETF standards. At 446, classifier 38a may inject the subscriber's packet with the service header into the determined service chain for the subscriber.

Recall, the subscriber's packet may not be an FSOL packet but rather a subsequent packet for the subscriber, which may be determined at 412. If the subscriber's packet is not an FSOL packet, classifier 38a may determine a service chain to receive the subscriber's packet at 450 (e.g., using information stored at 434). At 452, classifier 38a may determine information to be included in a service header for the subscriber's packet (e.g., policy and/or charging information, IP address for local policy anchor 34, etc.). At 440, classifier 38a may encapsulate the policy and/or charging information and the IP address for local policy anchor 34 in a service header for the subscriber's packet. At 442, classifier 38b may append the packet with the service header. In one or more embodiments, the header may be an NSH as defined by IETF standards. At 446, classifier 38a may inject the subscriber's packet with the service header into the determined service chain for the subscriber. Although described for classifier 38a, it should be understood that any of the operations illustrated in FIG. 4 may also be performed by classifier 38b (e.g., for packets flowing toward a subscriber from a remote server or service via internet 50).

Figure 5:
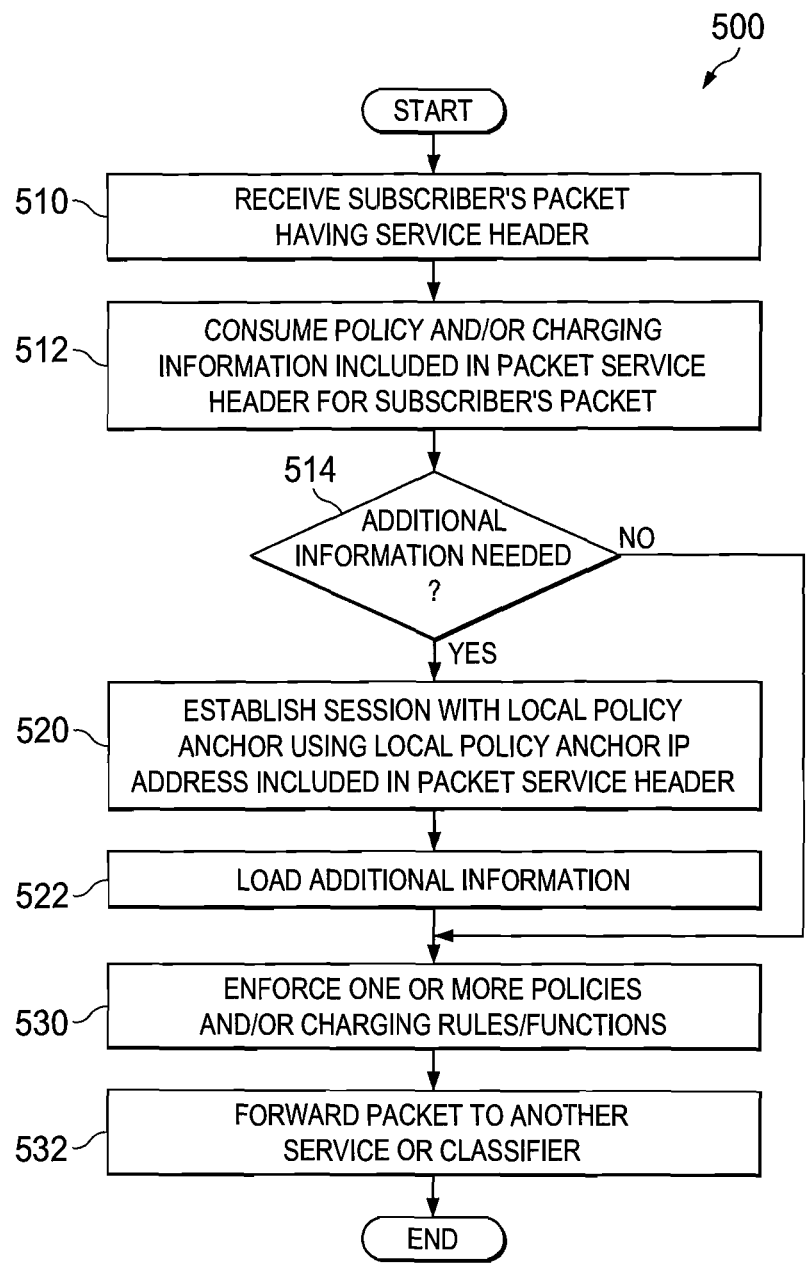
FIG. 5 is a simplified flow diagram illustrating example operations associated with consuming policy and/or charging information by one or more services in accordance with one potential embodiment of the communication system.

Turning to FIG. 5, FIG. 5 is a simplified flow diagram 500 illustrating example operations associated with consuming, by a given service anchored on a given service chain, policy and/or charging information that may be contained in a service header (e.g., NSH) for a subscriber's packet in one example operation of communication system 10. In one particular embodiment, these operations may involve a subscriber for a given UE (e.g., UE 12a), Gi-LAN SG 30, controller 32, local policy anchor 34, classifier 38a and any of services A-E anchored on any of service chains 36.1-36.N as shown in FIG. 1.

Processing may start at 510 when a give service anchored on a given chain may receive a subscriber's packet having a service header (e.g., an NSH). At 512, the service may consume policy and/or charging information included in the packet service header for the subscriber's packet. At 514, the service may determine if additional information is needed in order to enforce a given policy and/or charging rule/function. If so, at 520, the service may establish a session with local policy anchor 34 using the IP address for local policy anchor 34, which may be included in the service header for the subscriber's packet. At 522, the service may load the additional information. In various embodiments, policy and/or charging information may be loaded using push or pull mechanisms between the service and local policy anchor 34.

At 530, the service may enforce one or more policies and/or charging rules/functions for the subscriber (e.g., using additionally loaded information and/or information originally contained in the service header). After enforcing one or more policies and/or charging rules/functions, at 532 the service may forward the subscriber's packet with the service header to another service anchored on a chain or to a classifier (e.g., for a service at the end of a service chain, depending on the direction of flow for a packet).

Figure 6:
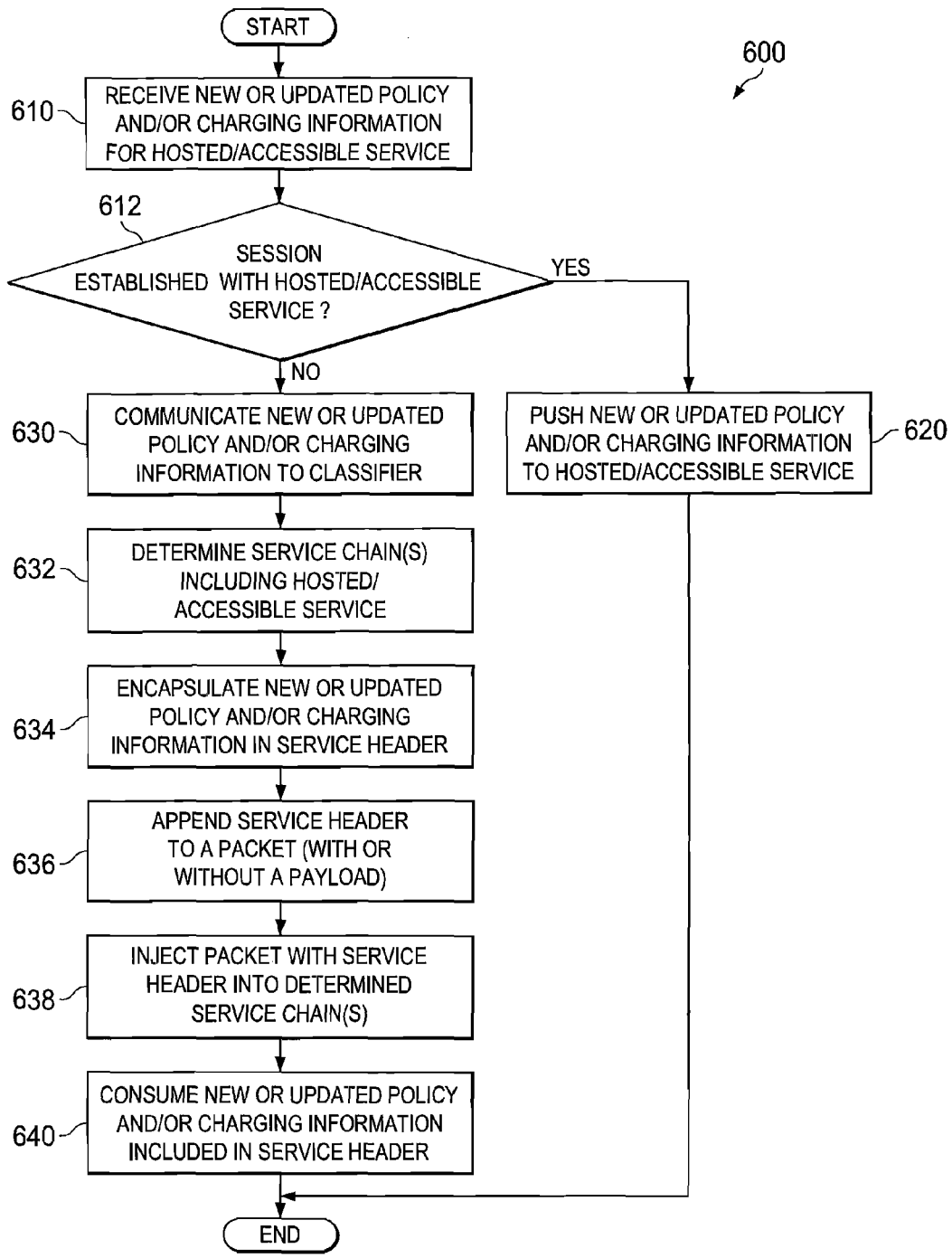
FIG. 6 is a simplified flow diagram illustrating example operations associated with communicating new or update policy and/or charging information to one or more services in accordance with one potential embodiment of the communication system.

Turning to FIG. 6, FIG. 6 is a simplified flow diagram 600 illustrating example operations associated with communicating new or updated policies from local policy anchor 34 to a given service hosted or accessible by Gi-LAN SG 30 (e.g., any of services A-E), which may be anchored on one or more service chains (e.g., any of service chains 36.1-36.N) in one example operation of communication system 10. In one particular embodiment, these operations may involve Gi-LAN SG 30, controller 32, local policy anchor 34, classifier 38a and any of services A-E anchored on any of service chains 36.1-36.N as shown in FIG. 1. Although described for classifier 38a, it should be understood that any of the operations illustrated in FIG. 6 may also be performed by classifier 38b.

Processing may start at 610 when local policy anchor 34 may receive new or updated policy and/or charging information for a given service hosted or accessible by Gi-LAN SG 30. At 612, local policy anchor 34 may determine if a session is currently established with the service. If a session has been established with the service, at 620, local policy anchor 34 may push the new or updated policy and/or charging information to the service.

However, if a session has not been established with the service, at 630, local policy anchor 34 may communicate the new or updated policy and/or charging information to classifier 38a. At 632, classifier 38a may determine one or more service chain(s), which may include the service to receive the new or updated policy and/or charging information. At 634, classifier 38a may encapsulate the new or updated policy and/or charging information in a service header (e.g., a NSH). At 636, classifier 38a may append the service header to a packet. In one or more embodiments, the service header may be appended to a packet that does not include a subscriber's data payload or may be appended to a packet that does include a subscriber's data payload. At 638, classifier 38a may inject the packet including the service header into the one or more determined service chains. Upon receiving the packet and corresponding header, at 640, the service may consume the policy and/or charging information in order to enforce the new or updated policies and/or charging rules/functions.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
  receiving an update for a service at a local policy anchor included in a gateway, wherein the service is included in one or more service chains accessible by the gateway and wherein the update is at least one of a policy update and a charging update;
  determining if the local policy anchor has a session established with the service;
  communicating the update to a classifier within the gateway if the local policy anchor does not have a session established with the service;
  determining, by the classifier, one or more service chains including the service if the local policy anchor does not have a session established with the service;
  injecting, by the classifier, a packet including a service header containing the update into the one or more determined service chains including the service if the local policy anchor does not have a session established with the service; and
  communicating the update to the service from the local policy anchor if the local policy anchor has a session established with the service.

2. The method of claim 1, wherein the communicating includes pushing the update to the service if the local policy anchor has a session established with the service.

3. The method of claim 1, further comprising:
  consuming, by the service, the update included in the service header for the packet.

4. The method of claim 1, wherein the service header is appended to a data packet containing subscriber data.

5. The method of claim 1, wherein the service header is a Network Service Header including at least one of:
  policy information for the service; and
  charging information for the service.

6. The method of claim 1, wherein the update is received from at least one of:
  a policy charging and rules function (PCRF);
  an online charging system (OCS); and
  an offline charging system (OFCS).

7. One or more non-transitory tangible media encoding logic that include instructions for execution that, when executed by a processor, is operable to perform operations comprising:
  receiving an update for a service at a local policy anchor included in a gateway, wherein the service is included in one or more service chains accessible by the gateway and wherein the update is at least one of a policy update and a charging update;
  determining if the local policy anchor has a session established with the service;
  communicating the update to a classifier within the gateway if the local policy anchor does not have a session established with the service;

determining, by the classifier, one or more service chains including the service if the local policy anchor does not have a session established with the service;

injecting by the classifier a packet including a service header containing the update into the one or more determined service chains including the service if the local policy anchor does not have a session established with the service; and communicating the update to the service from the local policy anchor if the local policy anchor has a session established with the service.

8. The media of claim 7, wherein the communicating includes pushing the update to the service if the local policy anchor has a session established with the service.

9. The media of claim 7, the operations further comprising:
consuming, by the service, the update included in the service header for the packet.

10. The media of claim 7, wherein the service header is appended to a data packet containing subscriber data.

11. The media of claim 7, wherein the service header is a Network Service Header including at least one of:
policy information for the service; and
charging information for the service.

12. The media of claim 7, wherein the update is received from at least one of:
a policy charging and rules function (PCRF);
an online charging system (OCS); and
an offline charging system (OFCS).

13. An apparatus, comprising:
a gateway;
a memory element for storing data; and
a processor that executes instructions associated with the data, wherein the processor and memory element cooperate such that the apparatus is configured for:

receiving an update for a service at a local policy anchor included in the gateway, wherein the service is included in one or more service chains accessible by the gateway and wherein the update is at least one of a policy update and a charging update;

determining if the local policy anchor has a session established with the service;

communicating the update to a classifier within the gateway if the local policy anchor does not have a session established with the service;

determining, by the classifier, one or more service chains including the service if the local policy anchor does not have a session established with the service;

injecting, by the classifier, a packet including a service header containing the update into the one or more determined service chains including the service if the local policy anchor does not have a session established with the service; and communicating the update to the service from the local policy anchor if the local policy anchor has a session established with the service.

14. The apparatus of claim 13, wherein the communicating includes pushing the update to the service if the local policy anchor has a session established with the service.

15. The apparatus of Claim 13, wherein the service header is appended to a data packet containing subscriber data.

16. The apparatus of Claim 13, wherein the service header is a Network Service Header including at least one of:
policy information for the service; and
charging information for the service.

17. The apparatus of claim 13, wherein the update is received from at least one of:
a policy charging and rules function (PCRF);
an online charging system (OCS); and
an offline charging system (OFCS).

* * * * *